(12) United States Patent
Puvvada et al.

(10) Patent No.: US 11,263,091 B2
(45) Date of Patent: Mar. 1, 2022

(54) USING INODE ENTRIES TO MIRROR DATA OPERATIONS ACROSS DATA STORAGE SITES

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ravi Kumar Komanduri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/795,428

(22) Filed: Feb. 19, 2020

(65) Prior Publication Data

US 2021/0255933 A1 Aug. 19, 2021

(51) Int. Cl.

| | |
|---|---|
| *G06F 11/00* | (2006.01) |
| *G06F 11/14* | (2006.01) |
| *G06F 11/20* | (2006.01) |
| *G06F 16/182* | (2019.01) |
| *G06F 9/54* | (2006.01) |
| *G06F 16/16* | (2019.01) |

(52) U.S. Cl.
CPC ......... *G06F 11/1464* (2013.01); *G06F 9/542* (2013.01); *G06F 9/546* (2013.01); *G06F 9/547* (2013.01); *G06F 11/1451* (2013.01); *G06F 11/1469* (2013.01); *G06F 11/2056* (2013.01); *G06F 16/164* (2019.01); *G06F 16/1824* (2019.01); *G06F 2201/84* (2013.01)

(58) Field of Classification Search
CPC ............. G06F 11/1464; G06F 11/1451; G06F 11/1469; G06F 11/2056; G06F 2201/84; G06F 16/164; G06F 16/1824; G06F 9/542; G06F 9/546; G06F 9/547; G06F 16/183
USPC ....................................................... 714/1–57
See application file for complete search history.

(56) References Cited

U.S. PATENT DOCUMENTS

| | | | |
|---|---|---|---|
| 9,003,227 B1 * | 4/2015 | Patel ................... | G06F 11/1435 714/15 |
| 9,176,980 B2 | 11/2015 | Ananthanarayanan et al. | |
| 9,407,624 B1 * | 8/2016 | Myers .................... | H04L 41/28 |
| 10,216,449 B1 * | 2/2019 | Li ........................ | G06F 11/1451 |

(Continued)

*Primary Examiner* — Sarai E Butler
(74) *Attorney, Agent, or Firm* — Zilka-Kotab, P.C.

(57) ABSTRACT

A computer-implemented method, according to one approach, includes: receiving a data operation request which includes an activated compound operation flag. The data operation request is added to a queue in a gateway node, and the data operation request is eventually transmitted to a disaster recovery site. An inode entry which corresponds to the portion of data is locked, and metadata associated with the inode entry is updated to indicate that the data operation request has been performed at the disaster recovery site. Supplemental data operation requests which correspond to the portion of data are also identified by evaluating the metadata associated with the inode entry. These supplemental data operation requests are transmitted to the disaster recovery site, and the metadata associated with the inode entry is updated to indicate that the supplemental data operation requests have been performed at the disaster recovery site. Furthermore, the inode entry is unlocked.

23 Claims, 9 Drawing Sheets

(56) References Cited

U.S. PATENT DOCUMENTS

| | | | |
|---|---|---|---|
| 10,225,331 B1* | 3/2019 | Freitas | H04L 12/2854 |
| 10,324,799 B2 | 6/2019 | Balasubramanian et al. | |
| 10,382,587 B2 | 8/2019 | Kohl et al. | |
| 10,649,852 B1* | 5/2020 | Starling | G06F 11/1448 |
| 2003/0188216 A1* | 10/2003 | Elko | G06F 11/2028 |
| | | | 714/1 |
| 2005/0081115 A1* | 4/2005 | Cheng | G06F 11/0793 |
| | | | 714/47.1 |
| 2005/0188248 A1* | 8/2005 | O'Brien | G06F 3/0643 |
| | | | 714/5.11 |
| 2006/0242464 A1* | 10/2006 | Holt | G06F 8/456 |
| | | | 714/25 |
| 2008/0256399 A1* | 10/2008 | Erdosi | G06F 11/366 |
| | | | 714/47.1 |
| 2010/0095164 A1* | 4/2010 | Kamei | G06F 16/188 |
| | | | 714/48 |
| 2011/0154107 A1* | 6/2011 | Alexander | G06F 9/3853 |
| | | | 714/10 |
| 2012/0151245 A1* | 6/2012 | Chang | G06F 16/1865 |
| | | | 714/4.1 |
| 2012/0260047 A1* | 10/2012 | Haines | G06F 3/0613 |
| | | | 711/154 |
| 2012/0324285 A1* | 12/2012 | Li | G06F 11/14 |
| | | | 714/20 |
| 2013/0055010 A1* | 2/2013 | Kotha | G06F 11/203 |
| | | | 714/4.11 |
| 2014/0089733 A1* | 3/2014 | Araki | G06F 11/0793 |
| | | | 714/15 |
| 2014/0298078 A1* | 10/2014 | Keremane | H04L 67/06 |
| | | | 714/4.1 |
| 2015/0317196 A1* | 11/2015 | Kazi | G06F 11/07 |
| | | | 714/47.2 |
| 2016/0182328 A1* | 6/2016 | Bhasin | H04L 43/067 |
| | | | 709/224 |
| 2017/0034310 A1 | 2/2017 | Victorelli | |
| 2017/0060702 A1* | 3/2017 | Dave | G06F 11/1441 |
| 2019/0095284 A1 | 3/2019 | Balasubramanian et al. | |
| 2019/0114230 A1* | 4/2019 | Ramachandran | G06F 3/067 |

* cited by examiner

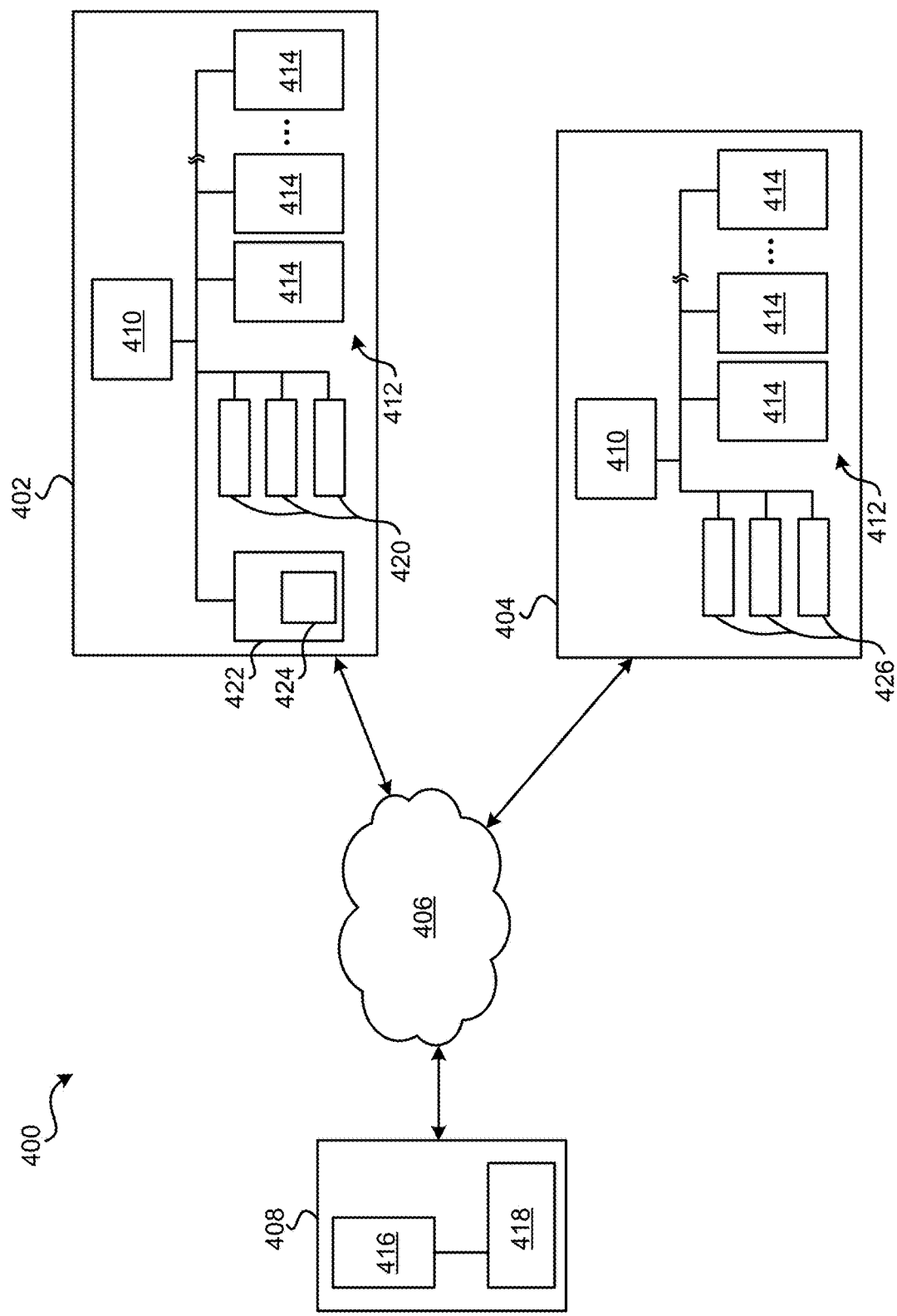

USING INODE ENTRIES TO MIRROR DATA OPERATIONS ACROSS DATA STORAGE SITES

BACKGROUND

The present invention relates to data storage systems, and more specifically, this invention relates to using inode entries and the metadata associated therewith to improve the efficiency by which data operations are mirrored across more than one data storage site.

In conventional data replication systems, users issue input/output (I/O) requests to a single storage location, such as a primary storage location, which ultimately modifies data according to the I/O requests that are received. In an effort to increase data retention, conventional data replication systems sometimes also implement a second storage location which is used to maintain a secondary (e.g., backup) copy of the data stored at the primary storage location. This redundant copy of the data at the recovery storage location is particularly useful in situations where the primary storage location becomes unavailable and/or experiences data loss. In some situations, the recovery storage location is even able to assume operational responsibility in response to determining that the primary storage location is unable to.

In such conventional systems, the primary storage location performs, processes, and finally forwards I/O requests to the second storage location for implementation. While this does result in improved data retention, conventional data storage schemes experience a notable increase in processing overhead as a result of processing each I/O request. For instance, each I/O request is transferred between different nodes at the primary location, thereby introducing performance delays which increase with the number of I/O requests that are processed.

Additional inefficiencies also arise as the number of nodes implemented at the primary location increase. For instance, situations involving multiple application nodes performing I/O requests on the same fileset or filesystem still consolidate requests on a same gateway node in order to maintain a desired operational order for the recovery storage location. Accordingly, processing delays are amplified as the gateway node is forced to lock the queue to ensure the desired operational order is maintained.

Moreover, a failure event experienced at any of the locations and/or the connections extending therebetween disrupts the transfer of I/O requests and results in more than one copy of data to become out-of-synch. In turn, this must be remedied before the system is operational, thereby introducing additional performance delays.

SUMMARY

A computer-implemented method, according to one approach, includes: receiving a data operation request which includes an activated compound operation flag. The received data operation request also mirrors a data operation performed on a portion of data at a production site. The data operation request is added to a queue in a gateway node, and the data operation request is eventually transmitted to a disaster recovery site. An inode entry which corresponds to the portion of data is locked, and metadata associated with the inode entry is updated to indicate that the data operation request has been performed at the disaster recovery site. Supplemental data operation requests which correspond to the portion of data are also identified by evaluating the metadata associated with the inode entry. These supplemental data operation requests are transmitted to the disaster recovery site, and the metadata associated with the inode entry is updated to indicate that the supplemental data operation requests have been performed at the disaster recovery site. Furthermore, the inode entry is unlocked.

In some instances, the data operation request is received from an application node. Accordingly, the data operation request is received from the application node along with a remote procedure call (RPC). However, the supplemental data operation requests are identified by the gateway node without receiving any additional RPCs from the application node. It follows that the supplemental data operation requests are identified by the gateway node without receiving any additional RPCs from the application node. Thus, by intentionally refraining from sending a request or RPC to the queue in the gateway node for the given supplemental data operation, the application node is able to significantly improve performance of the overarching system, especially over time. These improvements are achieved as a result of reducing processing overhead by decreasing the amount of traffic that occurs between the application and gateway nodes.

In some instances, snapshots may also be received. For instance, the computer-implemented method may include receiving a snapshot request which mirrors a snapshot taken of data at the production site. The snapshot request is thereby added to the queue. Accordingly, transmitting the supplemental data operation requests to the disaster recovery site includes: determining whether any of the supplemental data operation requests are not incorporated in the snapshot taken of the data at the production site. In response to determining that one or more of the supplemental data operation requests are not incorporated in the snapshot taken of the data at the production site, only the remaining supplemental data operation requests (which are incorporated in the snapshot) are transmitted to the disaster recovery site. This desirably ensures that any data operations which were implemented after the snapshot was taken at the production site are also transmitted to the disaster recovery site after the snapshot request, thereby ensuring that snapshots are implemented at both data storage sites in the same order with respect to various other data operations. This also ensures that the records of the data at the different sites are matching.

A computer program product, according to another approach, includes a computer readable storage medium having program instructions embodied therewith. The program instructions are readable and/or executable by a processor to cause the processor to: perform the foregoing method.

A system, according to yet another approach, includes: a gateway node, a processor, and logic integrated with the processor, executable by the processor, or integrated with and executable by the processor. The logic is configured to: perform the foregoing method.

A computer-implemented method, according to another approach, includes: causing a first data operation to be performed on a portion of data at a production site. A first data operation request having an activated compound operation flag is sent to a queue in a gateway node, where the first data operation request mirrors the first data operation. Supplemental data operations are also caused to be performed on the portion of data at the production site. Moreover, for each of the supplemental data operations: a determination is made as to whether the first data operation request has been performed at a disaster recovery site. In response to determining that the first data operation request has not yet been performed at a disaster recovery site, metadata associated with an inode entry which corresponds to the portion of data at the production site is updated to indicate the given supplemental data operation has been performed. A request to the queue in the gateway node for the given supplemental data operation is also intentionally refrained from being sent.

As a result, supplemental data operation requests are identified by the gateway node without actually sending any additional RPCs from the application node. Thus, by intentionally refraining from sending a request or RPC to the queue in the gateway node for the given supplemental data operation, the application node is able to significantly improve performance of the overarching system, especially over time. These improvements are achieved as a result of reducing processing overhead by decreasing the amount of traffic that occurs between the application and gateway nodes.

A computer program product, according to yet another approach, includes a computer readable storage medium having program instructions embodied therewith, the program instructions readable and/or executable by a processor to cause the processor to: perform the foregoing method.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 4 is a partial representational view of a distributed data storage system in accordance with one approach.

DETAILED DESCRIPTION

Figure 1:
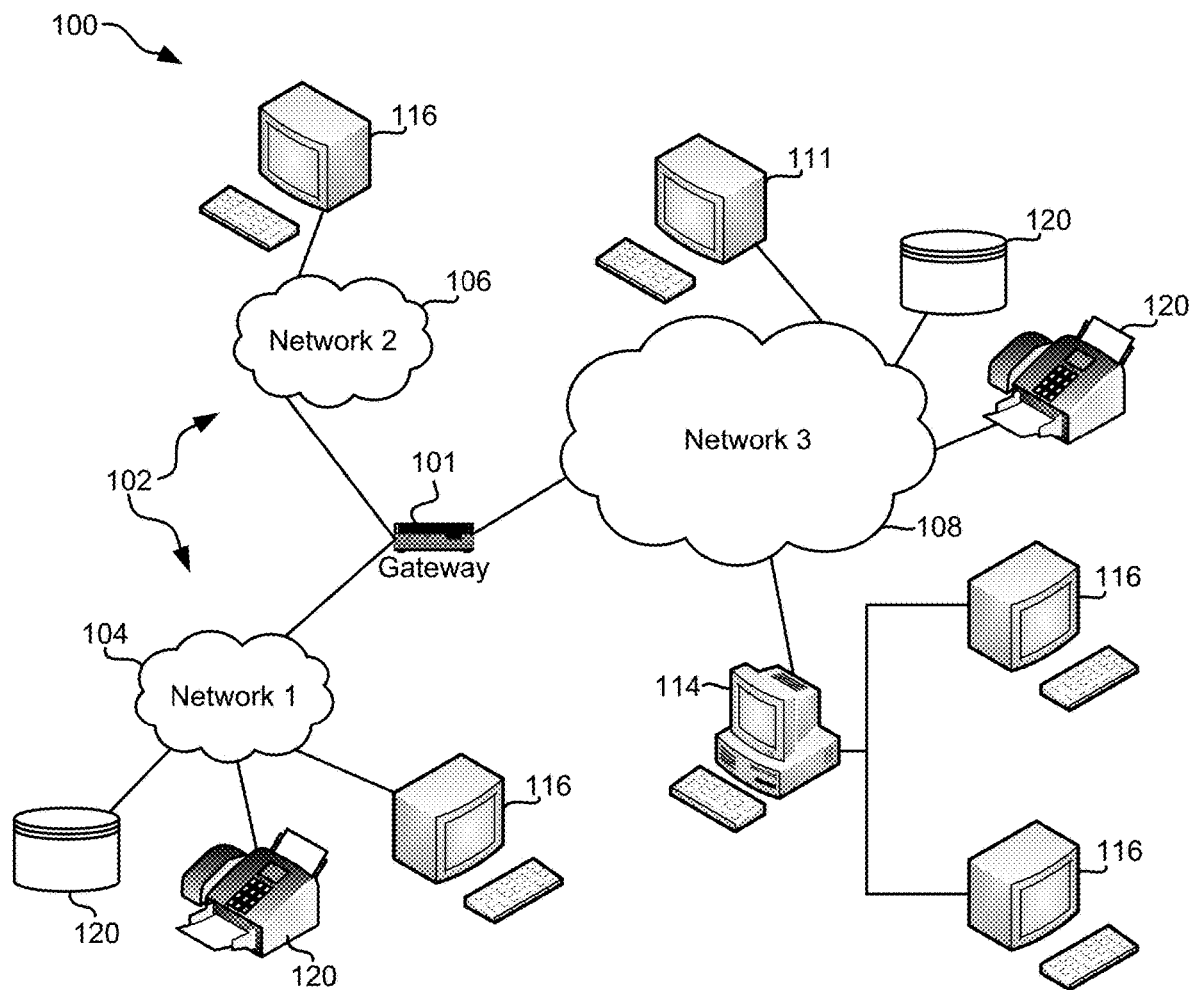
FIG. 1 is a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for mirroring write operations across more than one data storage site. It should be noted that "mirroring" write operations across storage devices refers to the process of reconciling differences in copies of the same data at two different storage locations, e.g., as would be appreciated by one skilled in the art after reading the present description. Accordingly, various ones of the approaches included herein are desirably able to efficiently perform compound operations such as "Create" and "Write" using at gateway node. Some of these approaches utilize inode bits which are selectively enabled for replication on the inodes which correspond to specific portions of data (e.g., files). Thus, application nodes are able to avoid queueing certain data operation requests to the gateway node. The gateway node is also able to consider, while replicating operations, all possible supplemental data operations that may have also been performed by simply inspecting the inode information. This selective queueing from the application node to the gateway node while utilizing inode metadata (e.g., bits) to improve efficiency of distributed data storage systems as a whole is described in further detail below.

In one general approach, a computer-implemented method includes: receiving a data operation request which includes an activated compound operation flag. The received data operation request also mirrors a data operation performed on a portion of data at a production site. The data operation request is added to a queue in a gateway node, and the data operation request is eventually transmitted to a disaster recovery site. An inode entry which corresponds to the portion of data is locked, and metadata associated with the inode entry is updated to indicate that the data operation request has been performed at the disaster recovery site. Supplemental data operation requests which correspond to the portion of data are also identified by evaluating the metadata associated with the inode entry. These supplemental data operation requests are transmitted to the disaster recovery site, and the metadata associated with the inode entry is updated to indicate that the supplemental data operation requests have been performed at the disaster recovery site. Furthermore, the inode entry is unlocked.

In another general approach, a computer program product includes a computer readable storage medium having program instructions embodied therewith. The program instructions are readable and/or executable by a processor to cause the processor to: perform the foregoing method.

In yet another general approach, a system includes: a gateway node, a processor, and logic integrated with the processor, executable by the processor, or integrated with and executable by the processor. The logic is configured to: perform the foregoing method.

In another general approach, a computer-implemented method includes: causing a first data operation to be performed on a portion of data at a production site. A first data operation request having an activated compound operation flag is sent to a queue in a gateway node, where the first data operation request mirrors the first data operation. Supplemental data operations are also caused to be performed on the portion of data at the production site. Moreover, for each of the supplemental data operations: a determination is made as to whether the first data operation request has been performed at a disaster recovery site. In response to determining that the first data operation request has not yet been performed at a disaster recovery site, metadata associated with an inode entry which corresponds to the portion of data at the production site is updated to indicate the given supplemental data operation has been performed. A request to the queue in the gateway node for the given supplemental data operation is also intentionally refrained from being sent.

In still another general approach, a computer program product includes a computer readable storage medium having program instructions embodied therewith, the program instructions readable and/or executable by a processor to cause the processor to: perform the foregoing method.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Depending on the approach, such user devices 116 may include a mainframe (e.g., as described herein), desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
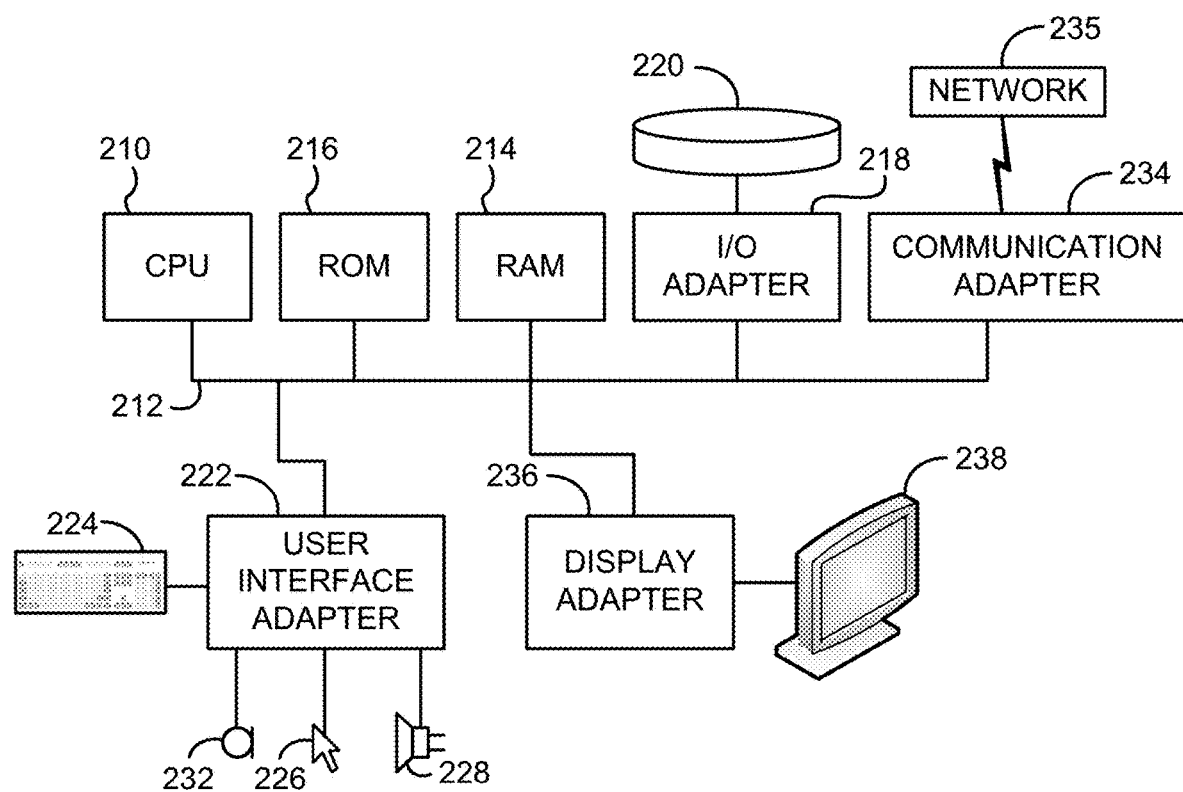
FIG. 2 is a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238. According to an exemplary approach, which is in no way intended to limit the invention, the disk storage units 220 may be incorporated in a DS8000 disk storage offered by IBM having a sales office at 1 New Orchard Rd., Armonk, N.Y. 10504.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using assembly language, C, and/or C++ language, or other programming languages, along with an object oriented programming methodology. Object oriented programming (OOP), which has become increasingly used to develop complex applications, may be used.

Figure 3:
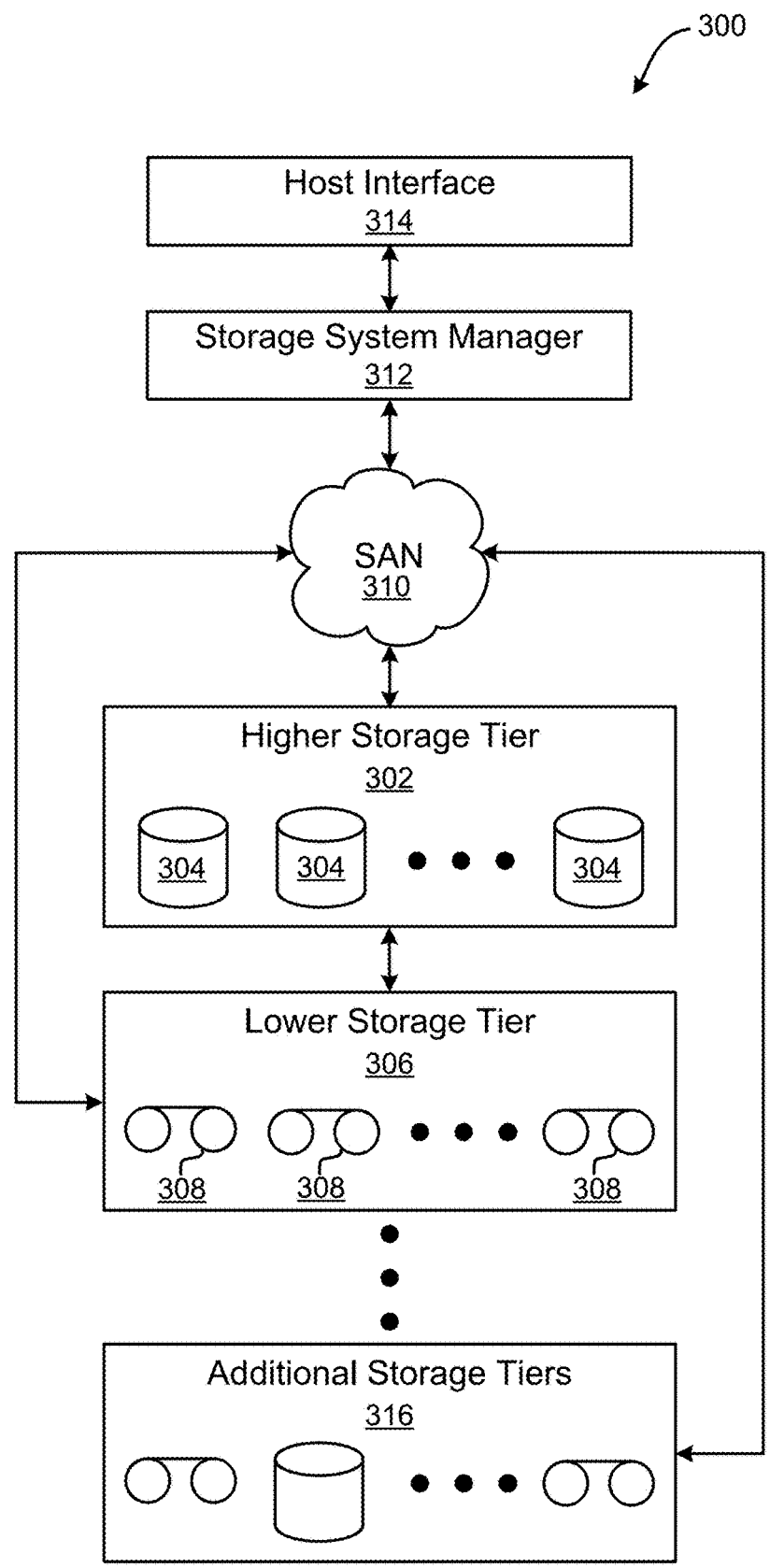
FIG. 3 is a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, multiple storage devices at different sites are implemented in an effort to maintain one or more redundant copies of data and increase data retention. These redundant copies of the data are particularly useful in situations where a primary storage site becomes unavailable and/or experiences data loss. In some situations, recovery storage sites are able to assume operational responsibility in response to determining that the primary storage site is unable to.

However, conventional data replication systems experience some significant performance setbacks in terms of implementing I/O requests across multiple storage locations. In such conventional systems, the primary storage location performs, processes, and finally forwards I/O requests to the second storage location for implementation. While this does result in improved data retention, conventional data storage schemes experience a notable increase in processing overhead as a result of processing each I/O request. For instance, each I/O request is transferred between different nodes at the primary location, thereby introducing performance delays which increase with the number of I/O requests that are processed.

Additional inefficiencies also arise as the number of nodes implemented at the primary location increase. For instance, situations involving multiple application nodes performing I/O requests on the same fileset or filesystem still consolidate requests on a same gateway node in order to maintain a desired operational order for the recovery storage location. Accordingly, processing delays are amplified as the gateway node is forced to lock the queue to ensure the desired operational order is maintained, e.g., as will be described in further detail below.

In sharp contrast to the aforementioned shortcomings experienced by conventional data replication systems, various ones of the approaches included herein are able to efficiently maintain more than one copy of data across more than one data storage site. Accordingly, I/O requests are implemented across the data storage sites without experiencing the performance delays which have plagued conventional systems, also without compromising data retention, e.g., as will be described in further detail below.

Looking to FIG. 4, a distributed data storage system 400 is illustrated in accordance with one approach. As an option, the present distributed data storage system 400 may be implemented in conjunction with features from any other approach listed herein, such as those described with reference to the other FIGS. However, such distributed data storage system 400 and others presented herein may be used in various applications and/or in permutations which may or may not be specifically described in the illustrative approaches listed herein. Further, the distributed data storage system 400 presented herein may be used in any desired environment. Thus FIG. 4 (and the other FIGS.) may be deemed to include any possible permutation.

As show, the distributed data storage system 400 includes a production site 402 and a disaster recovery site 404, both of which are connected to a network 406. A host 408 location is also connected to the network 406, which may be any type of network, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the production site 402, the disaster recovery site 404, and the host 408 are able to communicate with each other regardless of the amount of separation which exists therebetween, e.g., despite being positioned at different geographical locations.

Although each of the data storage sites 402, 404 and the host 408 may communicate with each other over the same single network 406 in some approaches, it should be noted that more than one network may be implemented between any two or more of the data storage sites 402, 404 and the host 408. For example, the host 408 may communicate with each of the data storage sites 402, 404 over network 406 while the production and disaster recovery sites 402, 404 communicate with each other over a separate network and/or a physical electrical connection which may extend therebetween. Accordingly, network 406 as illustrated in FIG. 4 is in no way intended to be limiting, and may actually include a number of different networks, e.g., as depicted in FIG. 1.

Each of the production and disaster recovery sites 402, 404 include a controller 410 (e.g., processor) which is coupled to a memory array 412. Depending on the approach, the memory array 412 included in each of the production and disaster recovery sites 402, 404 may consist of different types of storage components 414. For instance, the memory array 412 in the production site 402 includes higher performance storage components than those included in the disaster recovery site 404 in some approaches. It should be noted that in terms of the present description, "higher performance" may be measured with respect to achievable throughput, performance delays, reliability factors, etc. In other words, the production site 402 may include storage components which have a higher achievable throughput, lower performance delays, higher reliability factors, etc. in comparison to those of the storage components included in the disaster recovery site 404.

Looking specifically to the production site 402, the controller 410 is also coupled to a number of application nodes 420, as well as a gateway node 422. The application nodes 420 may be used (e.g., by the controller 410) to perform various data operation requests (also referred to herein as "I/O requests") on the data stored in the memory array 412. For instance, data operation requests may be received from the host 408, applications running in the background, other data storage sites, etc., e.g., as would be appreciated by one skilled in the art after reading the present description.

As data operations are performed at the production site 402 by the application nodes 420, the same data operations are also preferably performed at the disaster recovery site 404, e.g., such that the data stored at each of the sites 402, 404 remains mirrored copies of each other. The application nodes 420 thereby send various data operation requests to the gateway node 422 which mirror those that are performed on data that is stored at the production site 402. These data operation requests are preferably stored in a queue 424 before being transmitted to the server nodes 426 at the disaster recovery site 404 over the network 406 (e.g., see FIGS. 5A-5C below).

Referring still to FIG. 4, the server nodes 426 are preferably network file system (NFS) server nodes, but may include any desired type of server node, e.g., as would be appreciated by one skilled in the art after reading the present description. Moreover, upon receiving data operation requests from the gateway node 422, one or more of the server nodes 426 cause the data operations to be performed on the data stored in the disaster recovery site 404. As noted above, this ensures that a copy of the data stored at the production site 402 is maintained at the disaster recovery site 404.

The host 408 location may serve as an interface between users and the distributed data storage system 400 in some approaches. Thus, the host 408 receives and processes I/O requests originated by one or more users. It follows that the host 408 includes a controller 416 (e.g., processor) with a high enough achievable throughput to process the data received. The controller 416 is further coupled to memory 418 which may be used to at least temporarily store information (e.g., such as data, I/O requests, metadata, etc.) in a queue.

Once again, various ones of the approaches included herein are able to efficiently maintain more than one copy of data across more than one data storage location. Accordingly, the distributed data storage system 400 and the components included therein are desirably able to mirror I/O operations across production and disaster recovery sites in an efficient and effective manner. Each of the production and disaster recovery sites maintain a copy of the same data and assume the responsibility of keeping the copies in synch.

Figure 5A:
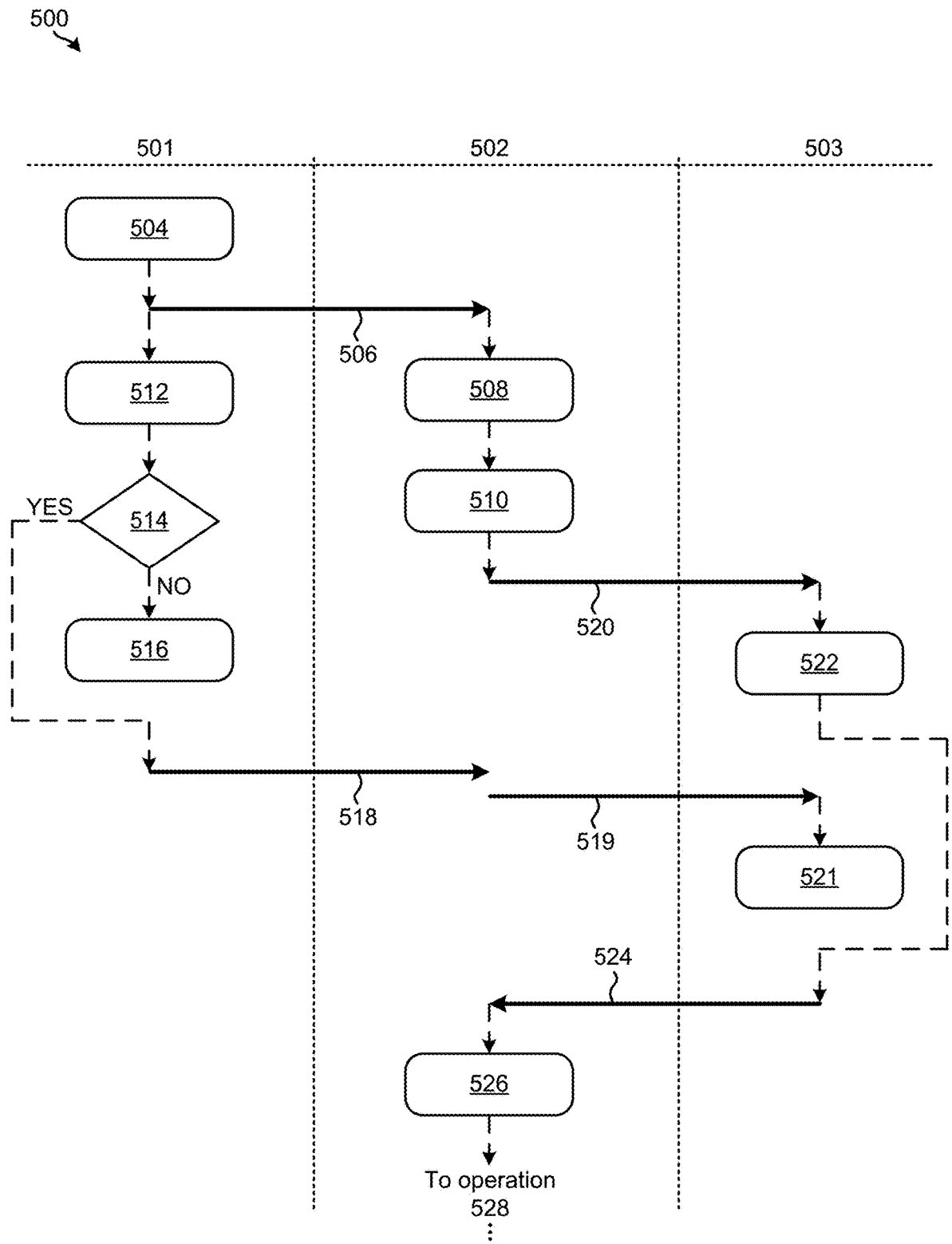
FIG. 5A is a flowchart of a method in accordance with one approach.
Figure 5A:
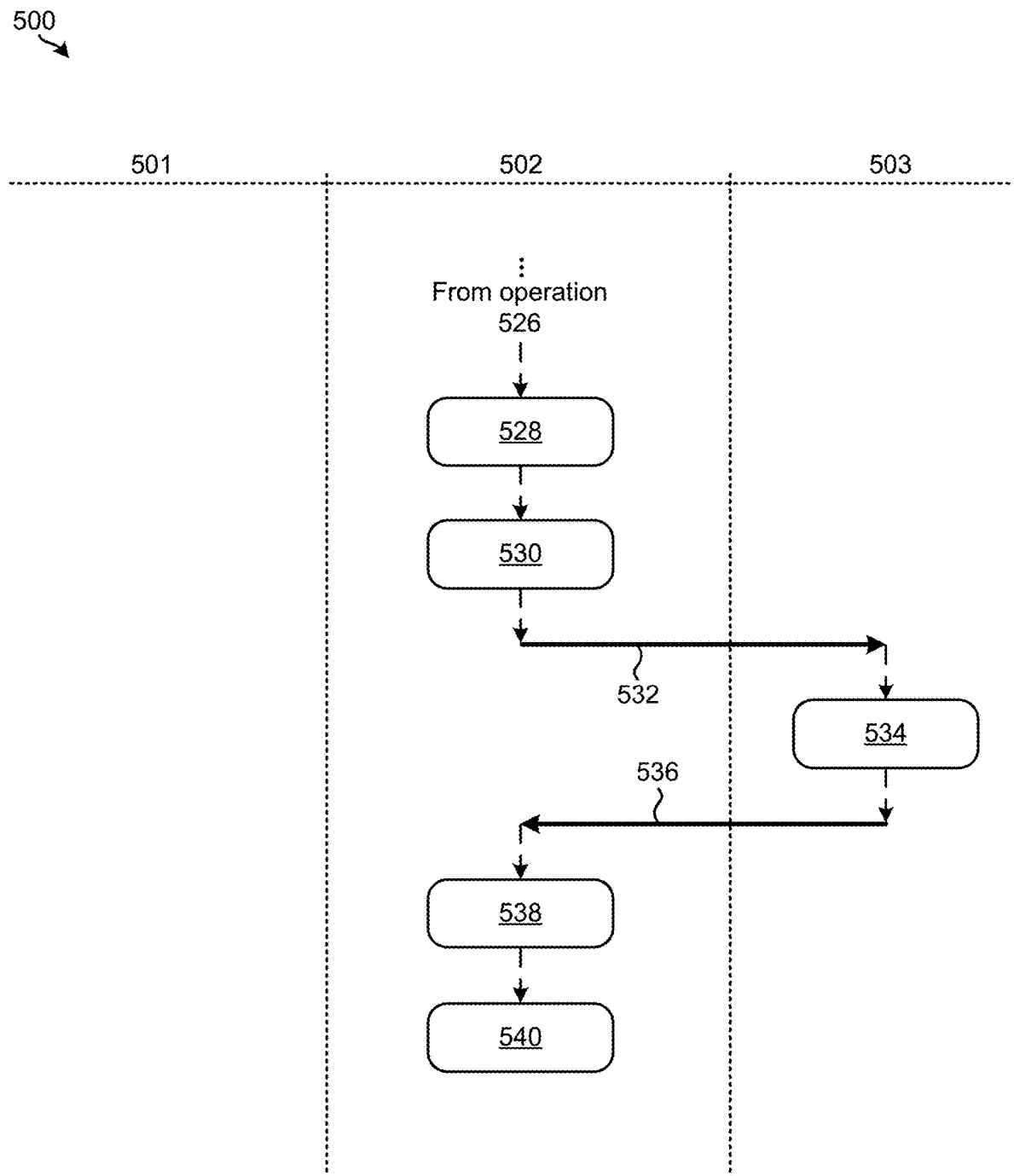

For instance, looking now to FIG. 5A, a flowchart of a computer-implemented method 500 for efficiently mirroring data operations across production and disaster recovery sites is shown according to one approach. The method 500 may be performed in accordance with the present invention in any of the environments depicted in FIGS. 1-4, among others, in various approaches. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a distributed data storage system. Moreover, each of the one or more processors are preferably configured to communicate with each other.

In various approaches, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a multi-tiered data storage system. For instance, node 501 may include one or more processors which are electrically coupled to an application node at a production site of a distributed data storage system (e.g., see application nodes 420 of FIG. 4 above). Node 502 may include one or more processors which are electrically coupled to a gateway node at a production site of a distributed data storage system (e.g., see gateway node 422 of FIG. 4 above). Furthermore, node 503 may include one or more processors which are electrically coupled to a server node at a disaster recovery site of a distributed data storage system (e.g., see server nodes 426 of FIG. 4 above). Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 is performed by the one or more processors at node 501 and includes causing a first data operation to be performed on a portion of data at a production site. The first data operation may be performed in response to a request received from a host, a running application, another storage site, etc. Moreover, causing the first data operation to be performed may be achieved differently depending on the particular approach. For instance, in some approaches the one or more processors at node 501 may simply send an instruction to the data storage components to actually perform the first data operation. In other approaches, the one or more processors at node 501 may simply send another request to a data storage controller which in turn instructs the data storage components to actually perform the first data operation.

Certain types of data operations are typically accompanied by one or more supplemental data operations. For instance, a new data write operation (e.g., a "Create" operation) typically involves actually creating a file in storage, truncating the file, writing data to the file, and setting various attributes corresponding to the written file (e.g., Chmod, Chown, etc.). These supplemental data operations may also be identified by examining a queue to which the first data operation was added. Thus, a correlation may be made between certain types of data operations and the supplemental data operations which correspond thereto. This correlation may further be utilized to improve the process of mirroring data operations across production and disaster recovery sites, e.g., as will soon become apparent.

From operation 504, method 500 proceeds to operation 506 which includes sending a first data operation request having an activated compound operation flag to node 502. As noted above, node 502 may include one or more processors which are electrically coupled to a gateway node at a production site of a distributed data storage system (e.g., see gateway node 422 of FIG. 4 above). Accordingly, in preferred approaches operation 506 includes sending a first data operation request having an activated compound operation flag to the queue in the gateway node. The first data operation request also mirrors the first data operation performed in operation 504 such that any changes made to the data at the production site are eventually replicated at the disaster recovery site.

The first data operation request is sent to the gateway node along with a RPC. While sending the RPC along with the first data operation request slightly increases processing overhead and reduces efficiency, it allows for the first data operation request to be successfully performed at the disaster recovery site. However, performance of the system as a whole may be significantly improved by limiting the number of RPCs that are sent between the application nodes and the gateway node. It should also be noted that the used or RPCs herein are in no way intended to limit the invention. Rather, any type of programming command(s) which would be apparent to one skilled in the art after reading the present description may be implemented in the various approaches herein.

Changes to data in a fileset and/or filesystem may be tracked based on a few bits which are enabled on the corresponding inode entry. Inode entries are maintained in an inode data structure which may be stored at the production site and maintained by a central storage controller (e.g., see controller 410 of FIG. 4). These bits are useful when the normal queue of operations on the gateway node are lost, and recovery is tasked with figuring out which changes were lost such that they may ultimately be reflected at the disaster recovery site. Each application node, before queueing a data operation to the gateway node, sets these bits on the corresponding inode entry (e.g., depending on what operation is being performed on the files), and the gateway node will reset these replication bits after completing the data operation at the disaster recovery site. It follows that in situations where the data operation is not performed, the corresponding bits stay activated, thereby indicating how to rebuild following a failure event.

According to an example, which is in no way intended to limit the invention, the bits which may be set on a given inode entry may include: a create bit which is set when a file (e.g., portion of data) has been created at the production site, and has not yet been replicated to the disaster recovery site. Accordingly, the create bit is reset when the file has been successfully replicated to the disaster recovery site. The bits also include a dirty bit which is set a file experiences an in-place data write at the production site which has not yet been replicated to the disaster recovery site. An append bit is set in response to data being written beyond the last known offset on a given file at the production site, and has not yet been replicated to the disaster recovery site. Further still, a setattr bit is set when a file has had an attribute change at the production site which has not yet been replicated to the disaster recovery site, while the state bit is set in response to a file being created at the production site which has not yet been replicated to the disaster recovery site. In other words, when a state bit is set, it means that the corresponding file is available at the disaster recovery site, and the copy at the production site has attributes about its remote counterpart.

It follows that these various bits may be used to locally decide (e.g., at the application node) whether a data operation should be sent from an application node to a gateway node at the production site along with a corresponding RPC. For instance, situations in which one or more of these bits are enabled by a previously queued operation provides information about supplemental operations that are attempting to be queued. The application nodes may thereby evaluate the status of the inode bits to determine whether certain operations should not be sent directly to the gateway node queue, thereby avoiding the RPC overhead that would otherwise be experienced between the application and gateway nodes in the application path.

With continued reference to FIG. 5A, in response to receiving the first data operation request including the activated (e.g., set) compound operation flag, the gateway node at node 502 is able to decipher that the corresponding inode entry should be inspected for metadata which indicates which supplemental data operations were also performed, e.g., as will soon become apparent. Proceeding to operation 508, the first data operation request is added to the queue in the gateway node, followed by operation 510 which includes observing (e.g., fulfilling) an asynchronous replication delay. The delay allows for any such supplemental data operations to be performed before sending the first data operation to the disaster recovery site.

Returning to node 501, operation 512 includes causing supplemental data operations to be performed on the portion of data at the production site. As noted above, these supplemental data operations correspond to the first data operation and may be indicated in the inode entry which corresponds to the portion of data at the production site (e.g., file) which the first data operation was performed on. Moreover, for each of the supplemental data operations, a determination is made as to whether the first data operation request has been performed at a disaster recovery site. See decision 514. In response to determining that the first data operation request has not yet been performed at a disaster recovery site, method 500 proceeds to operation 516 which includes updating metadata associated with an inode entry which corresponds to the portion of data at the production site to indicate the given supplemental data operation has been performed.

In other words, operation 516 includes updating the inode entry to indicate that the given supplemental data operation has been performed at the production site. The inode entry may thereby be examined by the gateway node to determine that the given supplemental data operation has been performed, obviating the overhead that would have otherwise been experienced by sending a supplemental data operation request along with an RPC from the application node to the gateway node. It follows that the supplemental data operation requests are identified by the gateway node without receiving any additional RPCs from the application node. Thus, by intentionally refraining from sending a request or RPC to the queue in the gateway node for the given supplemental data operation, the application node is able to significantly improve performance of the overarching system, especially over time.

However, returning to decision 514, method alternatively proceeds to operation 518 in response to determining that the first data operation request has been performed at the disaster recovery site. There, operation 518 includes sending a request to the queue in the gateway node for each of the remaining supplemental data operations. These remaining supplemental data operations are sent to node 503 in operation 519, and node 503 causes each of the remaining supplemental data operations to be performed at the disaster recovery site. See operation 521. Once the first data operation request has been performed, the production site locks the inode entry such that the various bits may be reset, e.g., as discussed above. It follows that once the base data operation has been performed, the supplemental data operations are sent to the gateway node directly, along with RPCs.

Returning to node 502, in response to the replication delay being observed, method 500 proceeds from operation 510 to operation 520 which includes transmitting the first data operation request to a disaster recovery site at node 503. In turn, node 503 causes the first data operation request to be performed at the disaster recovery site. See operation 522. Proceeding now to operation 524, node 503 returns an indication that the first data operation has been successfully replicated there, whereby method 500 proceeds to operation 526.

There, operation 526 includes locking an inode entry which corresponds to the portion of data. As noted above, in response to performing a data operation, the corresponding inode entry is locked to reset the various bits (e.g., reset the metadata). Accordingly, operation 528 includes updating metadata associated with the inode entry to indicate that the data operation request has been performed at the disaster recovery site.

In addition to updating the metadata as such, the metadata is also preferably inspected for indications that supplemental data operations were performed at the production site. As noted above, using various bits associated with an inode entry may allow for the gateway node to identify certain operations that were performed on the data at the production site without actually receiving a request and/or RPC from the application nodes. This desirably reduces processing overhead, network traffic, queue flooding, etc. Accordingly, looking to operation 530, there method 500 includes identifying supplemental data operation requests which correspond to the portion of data by evaluating the metadata associated with the inode entry.

In response to identifying the supplemental data operation requests, node 502 transmits each of the supplemental data operation requests to the disaster recovery site at node 503, e.g., such that they may be replicated there. See operation 532. Upon receiving the supplemental data operation requests, node 503 causes the supplemental data operation requests to be performed at the disaster recovery site. See operation 534. An acknowledgement is returned to node 502 in operation 536, and proceeding to operation 538, the metadata associated with the inode entry is updated to indicate that the supplemental data operation requests have been performed at the disaster recovery site. Furthermore, operation 540 includes unlocking the inode entry.

From operation 540, a determination may be made that the first data operation, as well as the supplemental data operations, have been successfully reconciled across the production site and the disaster recovery site. In other words, it may be concluded that the data at each of the data storage sites has been successfully reconciled. Accordingly, additional steps based on this information, e.g., such as sending a subsequent write command, advancing an I/O buffer, updating a logical-to-physical table, etc., may be performed as desired. It follows that any one or more of the processes included in method 500 may be repeated for subsequent data operations.

It follows that the various approaches described above with respect to method 500 are desirably able to reduce processing overhead by reducing the amount of traffic that occurs between the application and gateway nodes. For instance, various ones of the approaches described herein are able to achieve a reduction in the number of RPCs that are sent from the application nodes. Accordingly, it is preferred that the various processes included in these approaches are applied to each data operation which involves supplemental data operations as described herein.

Figure 5B:
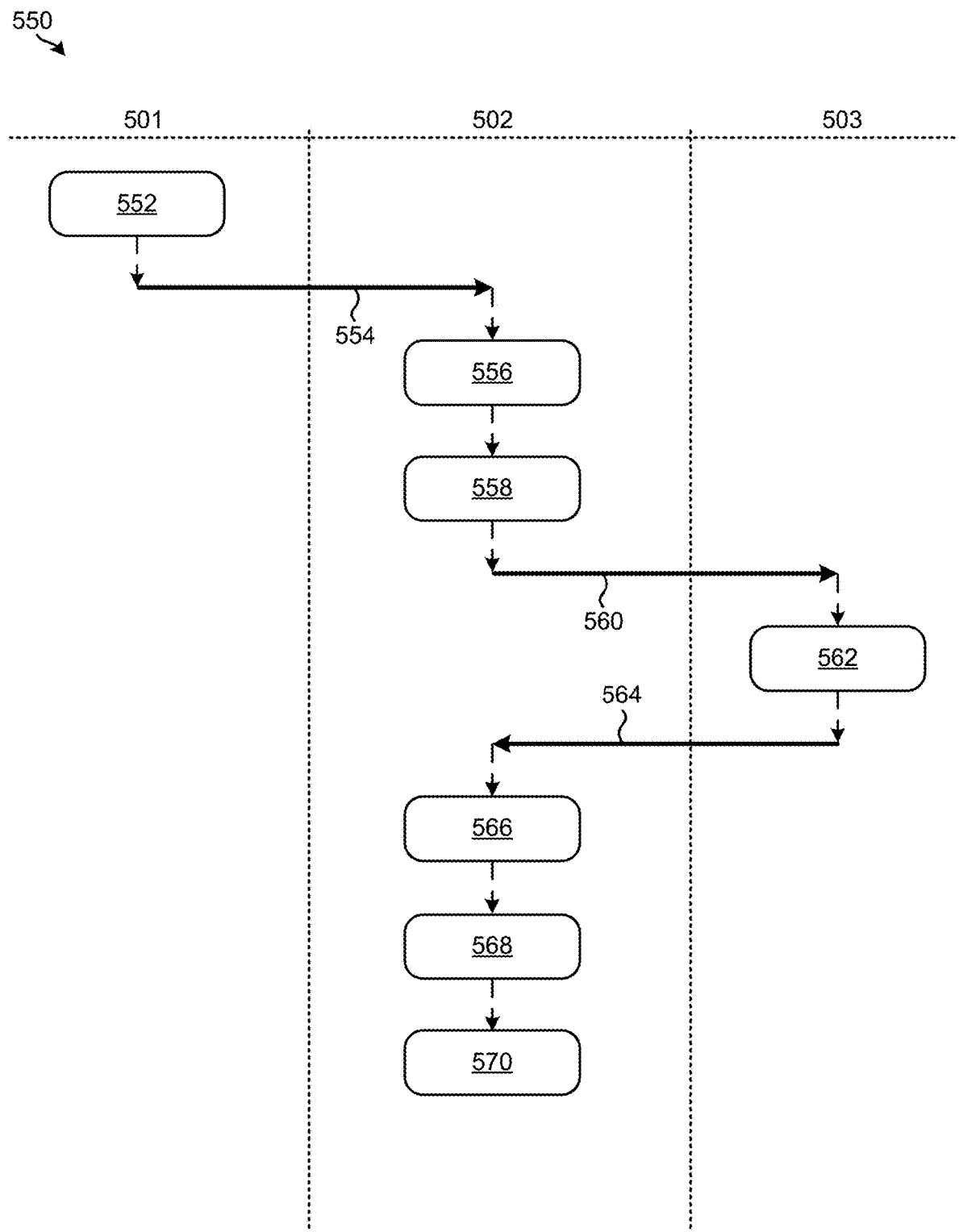
FIG. 5B is a flowchart of a method in accordance with one approach.

While the various operations described above with respect to FIG. 5A correspond to a data operation request which includes an activated compound operation flag, some received data operation requests may not. For instance, FIG. 5B illustrates a method 550 for mirroring data operations without activated compound operation flags across production and disaster recovery sites, in accordance with one approach. The method 550 is presented below in the context of the distributed data storage system referenced above in method 500 and thereby incorporates the various components illustrated in FIG. 4. However, any of the processes included in method 550 may be performed in accordance with the present invention in any of the environments depicted in FIGS. 1-5A, among others, in various approaches. Of course, more or less operations than those specifically described in FIG. 5B may be included in method 550, as would be understood by one of skill in the art upon reading the present descriptions.

Each of the steps of the method 550 may be performed by any suitable component of the operating environment. For example, in various approaches, the method 550 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5B, operation 552 of method 550 is performed by the one or more processors at node 501 and includes causing a second data operation to be performed on a second portion of data (e.g., file) at a production site. The second data operation may be performed in response to a request received from a host, a running application, another storage site, etc. Moreover, causing the second data operation to be performed may be achieved differently depending on the particular approach, e.g., as described above.

From operation 552, method 550 proceeds to operation 554 which includes sending a second data operation request to node 502. In the present approach, the second data operation request does not involve performing supplemental data operations and therefore does not include an activated compound operation flag. While certain data operations may have one or more supplemental data operations which are typically performed in conjunction, other data operations may not. For example, data rename operations may not be performed in a compound manner.

As noted above, node 502 may include one or more processors which are electrically coupled to a gateway node at a production site of a distributed data storage system (e.g., see gateway node 422 of FIG. 4 above). Accordingly, in preferred approaches operation 554 includes sending the second data operation request to the queue in the gateway node. It should also be noted that the second data operation request mirrors the second data operation performed in operation 552 such that any changes made to the data at the production site are eventually replicated at the disaster recovery site.

In response to receiving the second data operation request, node 502 adds the second data operation request to the queue in the gateway node. See operation 556. Optional operation 558 further includes observing (e.g., fulfilling) an asynchronous replication delay. Data operation requests which do not include an activated compound operation flag are not expected to involve any supplemental data operations and therefore may be performed without observing a predetermined delay in some approaches. However, the asynchronous replication delay may be pre-applied to every data operation request that is received in other approaches.

Proceeding to operation 560, there method 550 includes transmitting the second data operation request in the queue to the disaster recovery site at node 503. In turn, node 503 causes the second data operation request to be performed at the disaster recovery site. See operation 562. Proceeding now to operation 564, node 503 returns an indication that the second data operation has been successfully replicated there, whereby method 500 proceeds to operation 566.

There, operation 566 includes locking a second inode entry which corresponds to the second portion of data at the production site which the second data operation was originally performed on. As noted above, in response to performing a data operation, the corresponding inode entry is locked to reset the various bits (e.g., reset the metadata). Accordingly, operation 568 includes updating metadata associated with the second inode entry to indicate that the second data operation request has been performed at the disaster recovery site. Furthermore, operation 570 includes unlocking the inode entry.

From operation 540, a determination may be made that the second data operation has been successfully reconciled across the production site and the disaster recovery site. In other words, it may be concluded that the data at each of the data storage sites has been successfully reconciled to incorporate the changes caused by the second data operation. Accordingly, additional steps based on this information, e.g., such as sending a subsequent write command, advancing an I/O buffer, updating a logical-to-physical table, etc., may be performed as desired. It follows that any one or more of the processes included in method 550 may be repeated for subsequent data operations.

While methods 500 and 550 are able to improve the efficiency by which various data operations are mirrored across production and disaster recovery sites by selectively adjusting metadata associated with inode entries, snapshot generation and transmission also have an effect on how these data operations are processed.

For instance, all filesystem operations are frozen in order to capture a snapshot of the production site. Moreover, this snapshot capture operation is queued below any existing fileset and/or filesystem level replication operations that are to be synchronized with the disaster recovery site. By queuing the snapshot creation below any of the existing operations in the queue, this ensures that the snapshot which is eventually replicated at the disaster recovery site will be preceded by the same data operations, thereby ensuring that the snapshots will include the same data at both the sites.

It follows that snapshot creations can cause issues with data integrity if not handled correctly. Accordingly, the approaches herein preferably include a short mechanism to identify snapshots being present in a queue and accordingly read data and/or metadata associated with compound operations to ensure successful capture and replication across the sites.

Figure 5C:
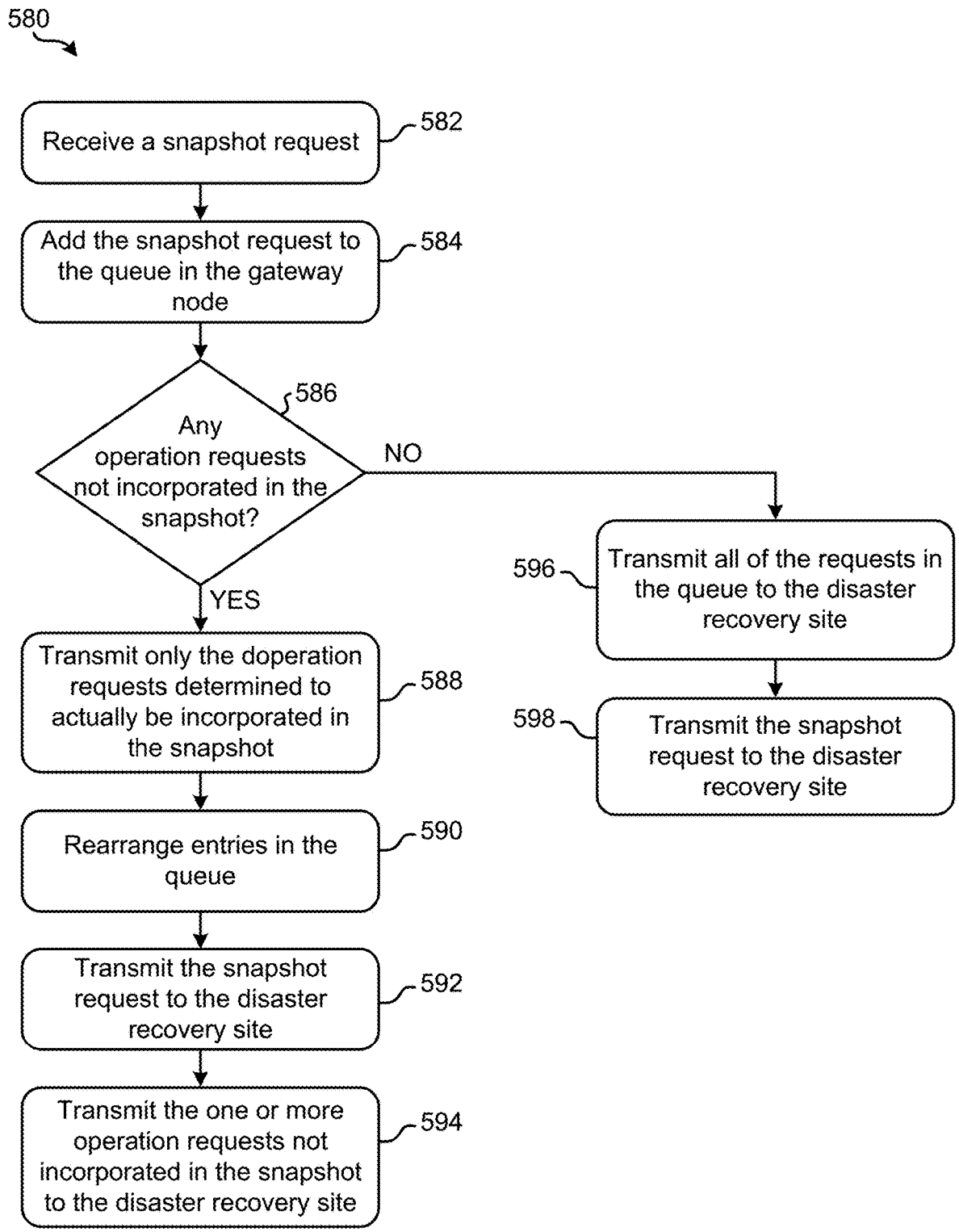
FIG. 5C is a flowchart of a method in accordance with one approach.

Looking now to FIG. 5C, a method 580 for incorporating snapshots in the process of mirroring data operations across production and disaster recovery sites, in accordance with one approach. The method 580 is presented below in the context of the distributed data storage system referenced above in methods 500, 550 and thereby incorporates the various components illustrated in FIG. 4. However, any of the processes included in method 580 may be performed in accordance with the present invention in any of the environments depicted in FIGS. 1-5B, among others, in various approaches. Of course, more or less operations than those specifically described in FIG. 5C may be included in method 580, as would be understood by one of skill in the art upon reading the present descriptions.

Each of the steps of the method 580 may be performed by any suitable component of the operating environment. For example, in various approaches, the method 580 may be partially or entirely performed by a controller, a processor, etc., or some other device having one or more processors therein. For instance, method 580 may be performed by the gateway node at a production site. The processor, e.g., processing circuit(s), chip(s), and/or module(s) implemented in hardware and/or software, and preferably having at least one hardware component may be utilized in any device to perform one or more steps of the method 580. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 582 includes receiving a snapshot request which mirrors a snapshot taken of the data at the production site. Snapshots may be performed at predetermined times, after a certain number of data operations have been performed at the production site, in response to receiving an instruction from a user, etc. Moreover, operation 584 includes adding the snapshot request to the queue in the gateway node.

As noted above, the order in which snapshots are taken with respect to other data operations that are performed on data effects the information that is included in the snapshot. It is therefore desirable that method 580 ensures that the snapshot request is transmitted to the disaster recovery site for implementation prior to any data operations which were not yet performed at the production site when the snapshot was taken of the production site. Accordingly, decision 586 includes determining whether any of the operation requests in the gateway node queue are not incorporated in the snapshot taken of the data at the production site. In other words, decision 586 determines whether any of the data operation requests and/or supplemental data operation requests in the gateway queue were actually implemented after the snapshot was taken of the data at the production site. As noted above, the snapshot request should be transmitted to the disaster recovery site for implementation prior to any such operations requests which were not implemented prior to the snapshot of the production site being taken to ensure compliance across the mirrored snapshots.

Decision 586 may be determined in any number of ways, e.g., such as comparing time stamps of the various requests in the queue, examining the order in which the requests were received, examining a performance log at the production site, etc. Moreover, in response to determining that one or more of the data operation requests and/or supplemental data operation requests are not incorporated in the snapshot taken of the data at the production site, method 580 proceeds to operation 588. There, operation 588 includes transmitting to the disaster recovery site only the data operation requests and/or supplemental data operation requests determined to actually be incorporated in the snapshot. In other words, only the data operation requests and/or supplemental data operation requests which performed at the production site prior to the snapshot being taken are transmitted to the disaster recovery site for implementation.

Furthermore, operation 590 includes rearranging entries in the queue such that entries corresponding to the one or more operation requests (e.g., data operation requests and/or supplemental data operation requests) determined to not be incorporated in the snapshot, are positioned behind an entry corresponding to the snapshot request. With respect to the present description, "behind" is intended to signify that the snapshot request will be transmitted to the disaster recovery site prior to the one or more other operation requests. It follows that the specific order in which the entries are rearranged into may depend on whether the queue is a first-in-first-out queue, a last-in-first-out queue, etc.

From operation 590, method 580 proceeds to operation 592 which includes transmitting the snapshot request to the disaster recovery site, while operation 594 includes transmitting, to the disaster recovery site, the one or more operation requests not incorporated in the snapshot. As noted above, the various processes in method 580 desirable ensure that snapshots are implemented at both data storage sites in the same order with respect to various other data operations. This ensures that the records of the data at the different sites are matching. Returning momentarily to decision 586, the flowchart proceeds to operation 596 in response to determining that all of the data operation requests and/or supplemental data operation requests are incorporated in the snapshot taken of the data at the production site. There, operation 596 includes transmitting all of the requests in the queue to the disaster recovery site, while operation 598 includes transmitting the snapshot request to the disaster recovery site.

According to an in-use example, which is in no way intended to limit the invention, when a Create request having an activated compound operations flag is positioned in the gateway queue along with a snapshot request, the gateway node ensures that only what is present on files in the snapshot are implemented prior to the snapshot being taken. Hence the Create request is compared against the data and/or metadata for replication in this first snapshot (S1). However, the queue may include other snapshot requests as well, e.g., S2, . . . , Sn.

Accordingly, when the gateway is ready to dequeue the Create request to the disaster recovery site for implementation, consideration is given as to what other requests are included in the queue. For instance, if the Snapshot inode of the file still holds the Create bit on it, then the dequeuing Create message queues a corresponding Write operation on the file (e.g., to write any data which was implemented after the snapshot). This Write operation on the file is queued after the corresponding snapshot (e.g., S1) from which the existing Create and Write has been played, and before a newer snapshot (e.g., S2).

Now this Write operation that is queued between S1 and S2, preferably only writes data that is incorporated in snapshot S2. Again, before dequeueing this Write operation from the queue, a new Write is inserted beyond S2 and before Sn (e.g., if the file has a Create/Dirty/Append bit on it in the Snapshot S2) Likewise, the newer Writes queued beyond a current snapshot, keep playing data up to the point that a next snapshot was taken. However, when there are no more snapshots in the queue, and the Write has no relevant bits on them in the previous snapshot (e.g., Sn), the operations may be considered to be in sync across the sites.

Again, asynchronous replication environments typically include one site that is designated as the production site and one site that is designated as the disaster recovery. The production site captures operations being performed at the local fileset and/or filesystem level, and maintains a local queue of operations in the first come first queue order. This queue is maintained on the gateway node at the production site, and is maintained in memory. The application nodes typically generate an RPC when a local operation is performed, so that the designated gateway node is updated with the operation that was performed on the fileset. However, in a clustered filesystem, there are multiple application nodes performing data operations on the filesystem and the gateway node is responsible for consolidating the volume of operations being performed on all the application nodes.

In typical application workloads, applications tend to perform compound operations, e.g., such as the combination of the following operations: Create, Truncate, Write, Chmod, Chown. An illustrative list of applications which implement such compound operations include Tar, Git, Make (e.g., to compile source code), etc. Conventionally, performing each of these individual operations involves sending separate RPC to the gateway node from the application node. However, each RPC sent between the application nodes and the gateway node introduces latency.

These delays are increased when an application performs a compound operation on millions of files. Live tests performed using with the above-mentioned conventional implementation have experienced performance decreases of between five and ten times.

Performance is further degraded after factoring in situations where the default block size implemented does not match the size of write operations being performed. For example, some applications implement a 64K default block size, while larger block sizes may be utilized. Relating it to the above problem, if each of file is approximately 10 MB in size, then the 64K default block size further increases the number of RPC that are sent between the application nodes and the gateway node. Specifically, this default block size increases the number of RPCs to at least 160 (i.e., 10×(1024/64)), where each RPC corresponds to a default 64K data block size.

If the user is more aware of the replication environment and how RPCs impact the application's performance, the best case doable is to update the default block size allowed to be updated. Tar application for example has a flag to control what block size it should use, as compared to say Git or the Make applications, which don't have a flag.

Even in the best case if the block size is made to match what majority of files there are in the given dataset of question, still the same sequence of operations (going by the 4 basic metadata operation sequence and the 1 data operation with at least 2 block writes)—would still take at least 6 Million RPC exchanges between the application and the gateway nodes.

In sharp contrast, various ones of the approaches herein minimize the number of RPCs that are transitioned between the application nodes and the gateway node at a given data storage site, while also ensuring data retention and a high operation success rate.

According to another in-use example, which again is in no way intended to limit the invention, an application node may send a number of operation requests to a gateway node at a production site. For instance, the application node may send a series of Create, Truncate, Write, Chmod, Chown, and Security extended attribute requests to the gateway node. As previously mentioned, the gateway node may implement an asynchronous replication delay at the gateway node (e.g., which may be defaulted to about 15 seconds, but could be higher or lower), where the asynchronous replication delay dictates how much time each operation request queued at the gateway node should wait in the queue before being replicated to the remote disaster recovery site. This delay helps allow for data operations to be queued at the gateway node as desired.

Figure 6:
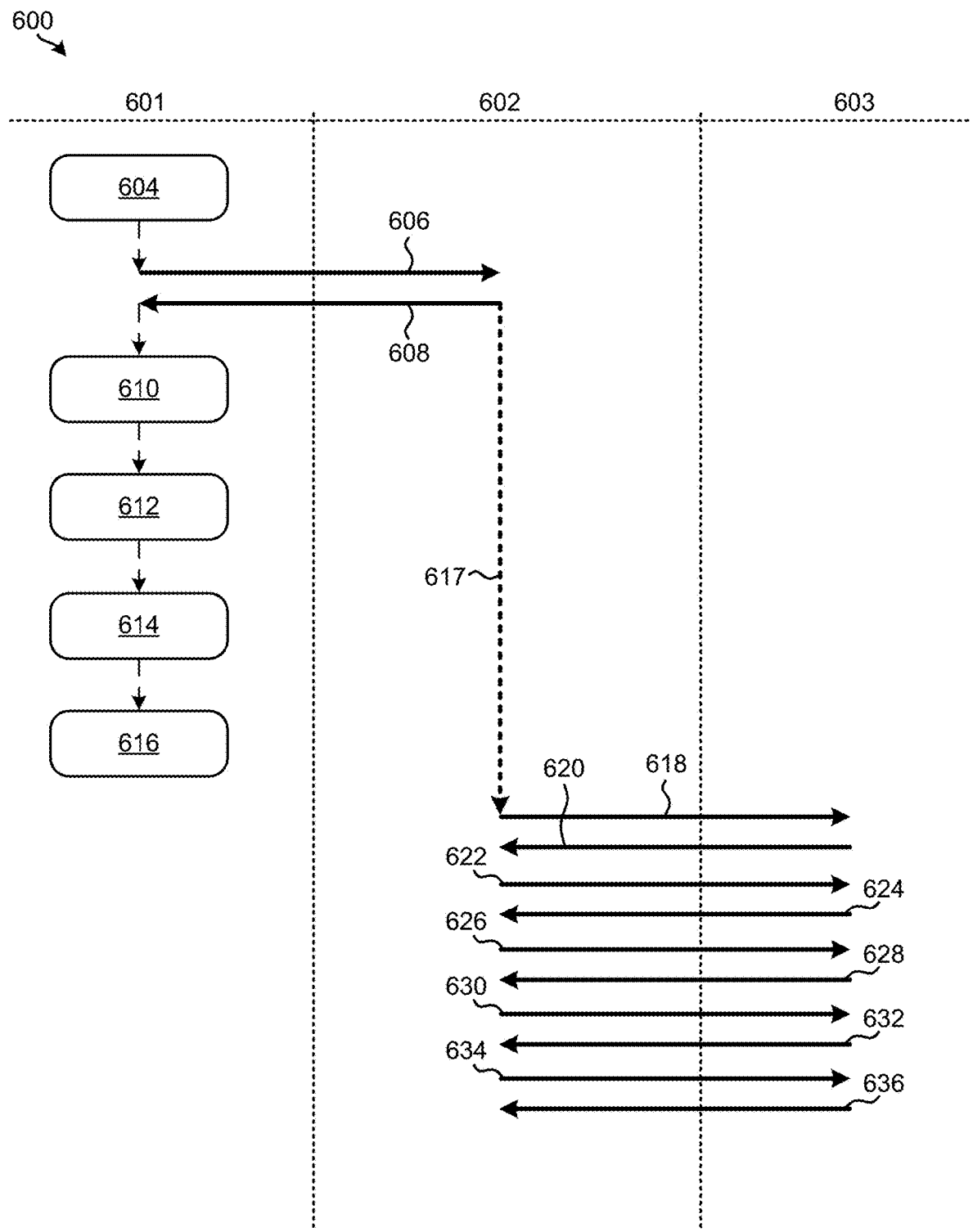
FIG. 6 is a flowchart of a method in accordance with one approach.

Looking now to FIG. 6, a flowchart of a computer-implemented method 600 for efficiently mirroring a Create data operation across production and disaster recovery sites is shown according to one approach. The method 600 may be performed in accordance with the present invention in any of the environments depicted in FIGS. 1-4, among others, in various approaches. Of course, more or less operations than those specifically described in FIG. 6 may be included in method 600, as would be understood by one of skill in the art upon reading the present descriptions.

Each of the steps of the method 600 may be performed by any suitable component of the operating environment. For example, each of the nodes 601, 602, 603 shown in the flowchart of method 600 may correspond to one or more processors positioned at a different location in a distributed data storage system. Moreover, each of the one or more processors are preferably configured to communicate with each other.

In various approaches, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 6 includes different nodes 601, 602, 603, each of which represent one or more processors, controllers, computer, etc., positioned at a different location in a multi-tiered data storage system. For instance, node 601 may include one or more processors which are electrically coupled to an application node at a production site of a distributed data storage system (e.g., see application nodes 420 of FIG. 4 above). Node 602 may include one or more processors which are electrically coupled to a gateway node at a production site of a distributed data storage system (e.g., see gateway node 422 of FIG. 4 above). Furthermore, node 603 may include one or more processors which are electrically coupled to a server node at a disaster recovery site of a distributed data storage system (e.g., see server nodes 426 of FIG. 4 above). Accordingly, commands, data, requests, etc. may be sent between each of the nodes 601, 602, 603 depending on the approach. Moreover, it should be noted that the various processes included in method 600 are in no way intended to be limiting, e.g., as would be appreciated by one skilled in the art after reading the present description. For instance, data sent from node 602 to node 603 may be prefaced by a request sent from node 603 to node 602 in some approaches.

As shown, operation 604 of method 600 is performed by the one or more processors at node 601 and includes causing the Create operation to be performed on the data at the production site, while operation 606 includes sending a Create operation request to the queue in the gateway node. As noted above, Create operations include performing a number of supplemental data operations. Accordingly, the Create operation request is sent to the queue in the gateway node with a compound operations flag activated, thereby indicating that the gateway node should inspect an inode entry corresponding to the data which was affected by the Create operation.

It should also be noted that the application node queues the Create operation on the file. The Create is queued at the gateway node with the aforementioned compound operations flag activated. The Create operation on the file also enables the Create bit to be activated in the corresponding inode entry.

Proceeding to operation 608, the gateway node adds the Create operation request to the queue and sends an acknowledgement back to the application node from which the request was received. Operation 610 further includes performing a truncate supplemental data operation on the data at the production site and subsequently updating the inode metadata to reflect that the truncate operation was performed. In response to completing the truncate operation, the application node identifies that a Create bit is already set in the inode for the file. This indicates to the application node that the previously queued Create operation request has not yet been replicated at the disaster recovery site, and therefore rather than actually send a request to the gateway node, the inode metadata may simply be updated to inform the gateway node. This allows for the gateway node to identify that the truncate supplemental data operation was performed without the application node actually sending an RPC to the gateway node, thereby reducing performance delays and processing overhead.

Similarly, operation 612 includes actually writing data included in the Create operation to the production site. As noted above, data is written in blocks of a given size. In some approaches the blocks are a default size, but they may be adjusted depending on the desired approach. As each block is written to the production site, node 601 preferably verifies that the inode metadata reflects the current state of the data that has been written. For example, dirty and append bits may be set in the inode entry to indicate the data operations being performed on the file are not yet reflected at the disaster recovery site. Again, this allows for the gateway node to identify that data is being written to the production site by the application node without actually sending an RPC to the gateway node, much less for each block of data that is written. This further reduces performance delays and processing overhead.

Following operation 612, method 600 proceeds to operation 614 which includes performing a Chmod operation to establish permission settings for the file and updating the inode metadata accordingly. Furthermore, operation 616 includes performing a Chown operation to set the owner and group associated with the file as well update the inode metadata accordingly. After node 602 has waited for an asynchronous replication delay to pass (e.g., represented by dashed line 617), requests in the queue of the gateway node are transmitted to the disaster recovery site. It follows that any supplemental operations including the chmod, chown, setAttrs, Set Extended Attributes, etc., operations may also involve verifying that the Create bit is set (in addition to the absence of the State bit) for the given file. This indicates that the previously queued Create operation has not yet been replicated at the disaster recovery site.

Looking to operation 618, node 602 identifies the Create operation request having the activated compound operations flag, and transmits the request to the disaster recovery site.

By identifying the activated compound operations flag, the gateway node is able to determine that the Create operation request should be accompanied by one or more supplemental data operations that were also performed at the production site. Accordingly, by inspecting an inode entry which corresponds to the file created by the Create operation, the gateway node is able to identify that the truncate operation was performed at 610, data was written to the created file in operation 612, the Chmod operation was performed at 614, and that the Chown operation was performed at 616 without receiving any such instructions, requests, commands, etc., from the application nodes. In fact, looking to FIG. 6, only the Create operation request with the activated compound operations flag is received from the application node in operation 606.

Upon receiving the request, node 603 performs the Create operation at the disaster recovery site, and returns an acknowledgement to node 502 at operation 620. In response to receiving the acknowledgement at operation 620, node 502 is able to update the inode metadata to indicate that the Create operation has been successfully mirrored at the disaster recovery site. In other words, the Create bit is reset on the inode.

As a part of the Create operation request itself, node 602 further transmits a truncate operation request to the disaster recovery site as indicated in the inode metadata. See operation 622. In other words, there is no separate bit on the inode designating the truncate operation on the file, so the gateway node will automatically Truncate the remote file, as part of the create operation itself. Node 603 performs the truncate operation at the disaster recovery site, and returns an acknowledgement to node 502 at operation 624. In response to receiving the acknowledgement at operation 624, node 502 is able to update the inode metadata to indicate that the truncate operation has been successfully mirrored at the disaster recovery site.

Furthermore, operation 626 includes transmitting a write operation request for all data written to the production site in operation 612. When the gateway node decides to send the write request to the disaster recovery site, the gateway node locks the inode in XW lock mode, thereby preventing any application nodes from making further changes to it. Once the XW lock is enacted, the size of the file from 0th offset is identified, as well as the sparseness on the file (e.g., the number of valid blocks therein). After taking identifying the size and data blocks, the dirty and append bits in the inode for the file are reset, and XW lock is released.

Node 603 performs the write operation at the disaster recovery site, and returns an acknowledgement to node 502 at operation 628. In response to receiving the acknowledgement at operation 628, node 502 is able to update the inode metadata to indicate that the write operation has been successfully mirrored at the disaster recovery site.

Further still, operation 630 includes transmitting a Chmod operation request to the disaster recovery site as indicated in the inode metadata. Node 603 performs the Chmod operation at the disaster recovery site, and returns an acknowledgement to node 502 at operation 632. In response to receiving the acknowledgement at operation 632, node 502 is able to update the inode metadata to indicate that the Chmod operation has been successfully mirrored at the disaster recovery site. Operation 634 also includes transmitting a Chown operation request to the disaster recovery site as indicated in the inode metadata. Node 603 performs the Chown operation at the disaster recovery site, and returns an acknowledgement to node 502 at operation 636. In response to receiving the acknowledgement at operation 636, node 502 is able to update the inode metadata to indicate that the Chown operation has been successfully mirrored at the disaster recovery site.

It should be noted that while performing the extended attribute operations such as Chmod and Chown, the gateway node preferably locks the corresponding inode in XW lock mode in order to prevent any application nodes from making any further changes to it. Once the XW lock is set, all the attributes associated with the file are identified (e.g., normal Attributes, NFSv4 ACLs, Extended Attributes, etc.). Thereafter, the dirty and append bits are reset on the file and the XW lock is released.

It follows that the various processes described above with respect to FIG. 6 are able to replicate the Create operation across the production and disaster recovery sites using only one RPC between the application nodes and the gateway node. This significantly improves performance in comparison to the 165 RPC exchanges implemented by conventional systems in an attempt to achieve a Create operation.

According to another in-use example, which again is in no way intended to limit the invention, an Append operation may be performed on a file having a 64 KB default block size. The Append operation may involve appending at least 10 MB data onto an existing 10 MB file. In this example, only the first block write will be queued as a separate write to the file on the gateway node (e.g., 64 B write at offset 10 MB) with a compound operations tag activated as well. As a result, each of the following append operations for the remaining 159 data blocks of 64 KB each, will cause the application node to identify the Append bit on the file and decide not to queue to the gateway any more append operations. Similarly, SetAttr operations performed on the file are not queued to the gateway directly, but rather the SetAttr bit is enabled on the inode by the application node.

Looking to the gateway node, the Append operation will be identified in the queue, but the gateway node will not only consider the 64 KB operation queued at offset 10 MB. Instead the gateway node locks the inode corresponding to the file in XW lock mode, and identifies how much data has been appended after the 10 MB offset. This allows for the gateway to consider all the blocks that have been written in addition to the first block write received from the application node. Once all of the write operations are replicated to the disaster recovery site, the gateway node resets the Append bit in order for the Application node to consider queueing further operations to the file.

Once the write operations have been completed, the gateway node also considers the Setattr bit on the inode entry in order to determine which additional attributes should be implemented at the disaster recovery site. It follows that the application nodes will generally look for any one of the bits being enabled on the local inode, and if any bits are enabled, the application node considers not sending a request (e.g., RPC) directly to the gateway node.

As noted above, various ones of the approaches herein are able to reduce the amount of processing traffic that is sent between the application nodes and the gateway node by utilizing inode entries. By updating metadata (e.g., bits) associated with a given inode entry, the gateway node is able to identify various operations that are performed at a production site without receiving any direct requests (e.g., RPCs) from the application nodes themselves. This desirably achieves multifold performance gains for the application nodes while performing data operations which are replicated to a secondary location. According to an example, which is in no way intended to limit the invention, some of the approaches herein are able to improve performance output by between four and eight times compared to conventional implementations. The gateway node is also subjected to fewer queued operations, thereby reducing the amount of pressure that is experienced by the gateway node, particularly over time.

Further still, some of the approaches included herein are able to reduce the number of locks that are performed on memory, thereby further reducing performance delays. It should also be noted that these various improvements are achieved without sacrificing the accuracy by which snapshots are replicated across multiple storage sites, thereby ensuring desirable data retention.

It should also be noted that the various approaches included herein are in no way intended to limit the invention. For instance, although many of the approaches are described above in the context of a distributed data storage system having two data storage sites, any number of data storage sites may be implemented. For example, a third copy of certain data (e.g., data deemed as being particularly "important") may be maintained in a third data storage site which is connected to the same network as the other storage sites.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a data operation request which includes an activated compound operation flag, wherein the data operation request mirrors a data operation performed on a portion of data at a production site;
   adding the data operation request to a queue in a gateway node;
   transmitting the data operation request to a disaster recovery site;
   locking an inode entry which corresponds to the portion of data;
   updating metadata associated with the inode entry to indicate that the data operation request has been performed at the disaster recovery site;
   identifying supplemental data operation requests which correspond to the portion of data by evaluating the metadata associated with the inode entry;
   transmitting the supplemental data operation requests to the disaster recovery site;
   updating the metadata associated with the inode entry to indicate that the supplemental data operation requests have been performed at the disaster recovery site; and
   unlocking the inode entry.

2. The computer-implemented method of claim 1, wherein the data operation request is received from an application node, wherein receiving the data operation request from the application node includes receiving a remote procedure call (RPC) from the application node, wherein the supplemental data operation requests are identified by the gateway node without receiving any additional RPCs from the application node.

3. The computer-implemented method of claim 2, wherein the gateway node and the application node are located at the production site, wherein the data operation request in the queue is sent to a network file system (NFS) server node at the disaster recovery site.

4. The computer-implemented method of claim 1, comprising:
   receiving a snapshot request which mirrors a snapshot taken of data at the production site; and
   adding the snapshot request to the queue,
   wherein transmitting the supplemental data operation requests to the disaster recovery site includes:
      determining whether any of the supplemental data operation requests are not incorporated in the snapshot taken of the data at the production site, and
      in response to determining that one or more of the supplemental data operation requests are not incorporated in the snapshot taken of the data at the production site, transmitting only the remaining supplemental data operation requests to the disaster recovery site.

5. The computer-implemented method of claim 4, wherein transmitting the supplemental data operation requests to the disaster recovery site includes:

rearranging entries in the queue such that an entry corresponding to the one or more supplemental data operation requests not incorporated in the snapshot taken of the data at the production site, is positioned behind an entry corresponding to the snapshot request;

transmitting the snapshot request to the disaster recovery site; and transmitting, to the disaster recovery site, the one or more supplemental data operation requests not incorporated in the snapshot taken of the data at the production site.

6. The computer-implemented method of claim 1, comprising:

receiving a second data operation request which does not include an activated compound operation flag, wherein the data operation request mirrors a second data operation request performed on a second portion of data at the production site;

adding the received second data operation request to the queue in the gateway node;

transmitting the second data operation request in the queue to the disaster recovery site;

locking a second inode entry which corresponds to the second portion of data;

updating metadata associated with the second inode entry to indicate that the second data operation request has been performed at the disaster recovery site; and unlocking the second inode entry.

7. A computer program product comprising a computer readable storage medium having program instructions embodied therewith, the program instructions readable and/or executable by a processor to cause the processor to:

receive, by the processor, a data operation request which includes an activated compound operation flag, wherein the data operation request mirrors a data operation performed on a portion of data at a production site;

add, by the processor, the received data operation request to a queue in a gateway node;

transmit, by the processor, the data operation request in the queue to a disaster recovery site;

lock, by the processor, an inode entry which corresponds to the portion of data;

update, by the processor, metadata associated with the inode entry to indicate that the data operation request has been performed at the disaster recovery site;

identify, by the processor, supplemental data operation requests which correspond to the portion of data by evaluating the metadata associated with the inode entry;

transmit, by the processor, the supplemental data operation requests to the disaster recovery site;

update, by the processor, the metadata associated with the inode entry to indicate that the supplemental data operation requests have been performed at the disaster recovery site; and unlock, by the processor, the inode entry.

8. The computer program product of claim 7, wherein the data operation request is received from an application node, wherein receiving the data operation request from the application node includes receiving a remote procedure call (RPC) from the application node, wherein the supplemental data operation requests are identified by the gateway node without receiving any additional RPCs from the application node.

9. The computer program product of claim 8, wherein the gateway node and the application node are located at the production site, wherein the data operation request in the queue is sent to a network file system (NFS) server node at the disaster recovery site.

10. The computer program product of claim 7, wherein the program instructions are readable and/or executable by the processor to cause the processor to:

receive, by the processor, a snapshot request which mirrors a snapshot taken of data at the production site; and add, by the processor, the snapshot request to the queue, wherein transmitting the supplemental data operation requests to the disaster recovery site includes:

determining whether any of the supplemental data operation requests are not incorporated in the snapshot taken of the data at the production site, and in response to determining that one or more of the supplemental data operation requests are not incorporated in the snapshot taken of the data at the production site, transmitting only the remaining supplemental data operation requests to the disaster recovery site.

11. The computer program product of claim 10, wherein transmitting the supplemental data operation requests to the disaster recovery site includes:

rearranging entries in the queue such that an entry corresponding to the one or more supplemental data operation requests not incorporated in the snapshot taken of the data at the production site, is positioned behind an entry corresponding to the snapshot request;

transmitting the snapshot request to the disaster recovery site; and transmitting, to the disaster recovery site, the one or more supplemental data operation requests not incorporated in the snapshot taken of the data at the production site.

12. The computer program product of claim 7, wherein the program instructions are readable and/or executable by the processor to cause the processor to:

receive, by the processor, a second data operation request which does not include an activated compound operation flag, wherein the data operation request mirrors a second data operation performed on a second portion of data at the production site;

add, by the processor, the received second data operation request to the queue in the gateway node;

transmit, by the processor, the second data operation request in the queue to the disaster recovery site;

lock, by the processor, a second inode entry which corresponds to the second portion of data;

update, by the processor, metadata associated with the second inode entry to indicate that the second data operation request has been performed at the disaster recovery site; and unlock, by the processor, the second inode entry.

13. A system, comprising:

a gateway node;

a processor; and logic integrated with the processor, executable by the processor, or integrated with and executable by the processor, the logic being configured to:

receive, by the processor, a data operation request which includes an activated compound operation flag, wherein the data operation request mirrors a data operation performed on a portion of data at a production site;

add, by the processor, the received data operation request to a queue in the gateway node;

transmit, by the processor, the data operation request in the queue to a disaster recovery site;

lock, by the processor, an inode entry which corresponds to the portion of data;

update, by the processor, metadata associated with the inode entry to indicate that the data operation request has been performed at the disaster recovery site;

identify, by the processor, supplemental data operation requests which correspond to the portion of data by evaluating the metadata associated with the inode entry;

transmit, by the processor, the supplemental data operation requests to the disaster recovery site;

update, by the processor, the metadata associated with the inode entry to indicate that the supplemental data operation requests have been performed at the disaster recovery site; and unlock, by the processor, the inode entry.

14. The system of claim 13, wherein the data operation request is received from an application node, wherein receiving the data operation request from the application node includes receiving a remote procedure call (RPC) from the application node, wherein the supplemental data operation requests are identified by the gateway node without receiving any additional RPCs from the application node.

15. The system of claim 14, wherein the gateway node and the application node are located at the production site, wherein the data operation request in the queue is sent to a network file system (NFS) server node at the disaster recovery site.

16. The system of claim 13, the logic being configured to:
receive, by the processor, a snapshot request which mirrors a snapshot taken of data at the production site; and
add, by the processor, the snapshot request to the queue, wherein transmitting the supplemental data operation requests to the disaster recovery site includes:
determining whether any of the supplemental data operation requests are not incorporated in the snapshot taken of the data at the production site, and
in response to determining that one or more of the supplemental data operation requests are not incorporated in the snapshot taken of the data at the production site, transmitting only the remaining supplemental data operation requests to the disaster recovery site.

17. The system of claim 16, wherein transmitting the supplemental data operation requests to the disaster recovery site includes:
rearranging entries in the queue such that an entry corresponding to the one or more supplemental data operation requests not incorporated in the snapshot taken of the data at the production site, is positioned behind an entry corresponding to the snapshot request;
transmitting the snapshot request to the disaster recovery site; and
transmitting, to the disaster recovery site, the one or more supplemental data operation requests not incorporated in the snapshot taken of the data at the production site.

18. The system of claim 13, the logic being configured to:
receive, by the processor, a second data operation request which does not include an activated compound operation flag, wherein the data operation request mirrors a second data operation performed on a second portion of data at the production site;
add, by the processor, the received second data operation request to the queue in the gateway node;
transmit, by the processor, the second data operation request in the queue to the disaster recovery site;

lock, by the processor, a second inode entry which corresponds to the second portion of data;

update, by the processor, metadata associated with the second inode entry to indicate that the second data operation request has been performed at the disaster recovery site; and unlock, by the processor, the second inode entry.

19. A computer-implemented method, comprising:
causing a first data operation to be performed on a portion of data at a production site;
sending a first data operation request having an activated compound operation flag to a queue in a gateway node, wherein the first data operation request mirrors the first data operation;
causing supplemental data operations to be performed on the portion of data at the production site; and
for each of the supplemental data operations:
determining whether the first data operation request has been performed at a disaster recovery site,
in response to determining that the first data operation request has not been performed at a disaster recovery site, updating metadata associated with an inode entry which corresponds to the portion of data at the production site to indicate the given supplemental data operation has been performed,
intentionally refraining from sending a request to the queue in the gateway node for the given supplemental data operation, and
in response to determining that the first data operation request has been performed at the disaster recovery site, sending a request to the queue in the gateway node for the given supplemental data operation.

20. The computer-implemented method of claim 19, wherein sending the first data operation request includes sending a remote procedure call (RPC) to the gateway node.

21. The computer-implemented method of claim 20, wherein operations are performed by an application node, wherein the gateway node and the application node are located at the production site.

22. A computer program product comprising a computer readable storage medium having program instructions embodied therewith, the program instructions readable and/or executable by a processor to cause the processor to:
cause, by the processor, a first data operation to be performed on a portion of data at a production site;
send, by the processor, a first data operation request having an activated compound operation flag to a queue in a gateway node, wherein the first data operation request mirrors the first data operation;
cause, by the processor, supplemental data operations to be performed on the portion of data at the production site; and
for each of the supplemental data operations:
determine, by the processor, whether the first data operation request has been performed at a disaster recovery site,
in response to determining that the first data operation request has not been performed at a disaster recovery site, update, by the processor, metadata associated with an inode entry which corresponds to the portion of data at the production site to indicate the given supplemental data operation has been performed,
intentionally refrain, by the processor, from sending a request to the queue in the gateway node for the given supplemental data operation, and
in response to determining that the first data operation request has been performed at the disaster recovery site, send, by the processor, a request to the queue in the gateway node for the given supplemental data operation.

23. The computer program product of claim 22, wherein sending the first data operation request includes sending a remote procedure call (RPC) to the gateway node, wherein the operations are performed by an application node, wherein the gateway node and the application node are located at the production site.

* * * * *